United States Patent [19]

Gulko

[11] Patent Number: 5,493,782
[45] Date of Patent: Feb. 27, 1996

[54] TOOL FOR HANDICAPPED PERSONS

[76] Inventor: Bruce N. Gulko, 138 Thomas Dr., Martinez, Ga. 30907-1548

[21] Appl. No.: 376,905

[22] Filed: Jan. 23, 1995

[51] Int. Cl.⁶ ............................................. B26B 15/00
[52] U.S. Cl. ...................................... 30/228; 30/298
[58] Field of Search ............................. 30/228, 231, 232, 30/296.1, 298, 382

[56] References Cited

U.S. PATENT DOCUMENTS

| | | | |
|---|---|---|---|
| 3,757,194 | 9/1973 | Weber et al. | 30/228 |
| 4,841,641 | 6/1989 | Laidlaw | 30/382 |
| 4,996,773 | 3/1991 | Albertson | 30/298 X |
| 5,031,323 | 7/1991 | Honsa et al. | 30/298 X |
| 5,150,523 | 9/1992 | McCurry | 30/228 |

*Primary Examiner*—Hwei-Siu Payer

[57] ABSTRACT

A hand tool, especially a pruning tool, for use by persons who are unable to grip a tool or actuate a trigger mechanism but who retain the use of an arm includes a forearm-guided longitudinally extending sleeve and means to secure this sleeve to the user's forearm. The sleeve carries a hand grip positioned forwardly of the sleeve so the user can position his arm along the sleeve while grasping the grip as best he can. The grip or the sleeve carries a tool structure, such as a pruning tool, which extends forwardly of the grip, and an electrically operated motor connected is used to operate the tool when an electrical connection is made. Means are provided for supplying electricity to the motor, this electric supply means including a mercury switch which is positioned to be tilted when the user tilts his forearm, this switch connecting the supply of electricity to the motor whenever the user's arm is raised or lowered into a desired position in which the wrist is positioned either above or below the elbow when it is desired to operate the tool. The switch also serves to disconnect the electric supply whenever the user's arm is not in the desired position.

9 Claims, 1 Drawing Sheet

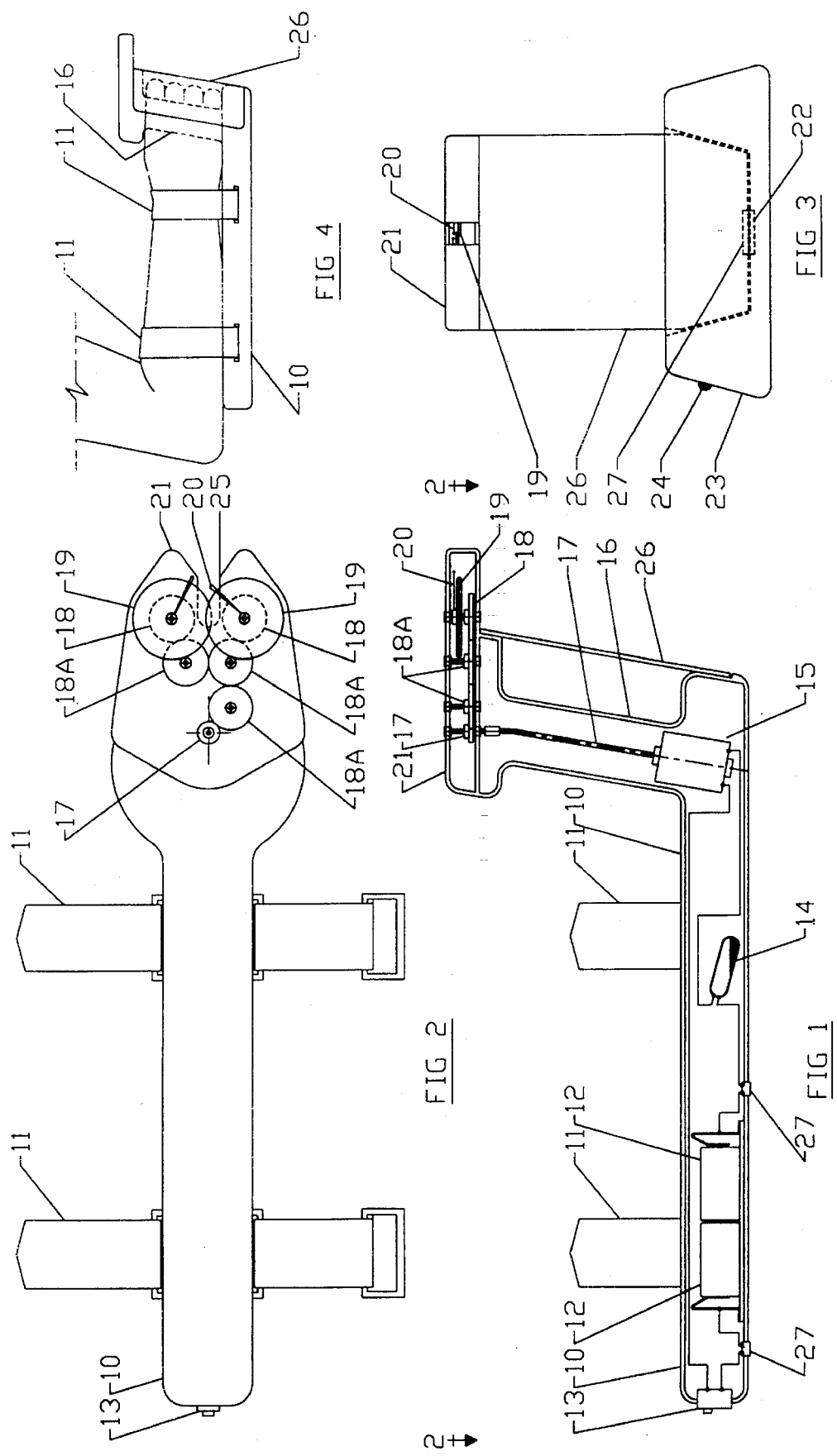

TOOL FOR HANDICAPPED PERSONS

TECHNICAL FIELD

This invention relates to hand tools which are specially adapted for use by persons who cannot manipulate their hands, but who retain the use of their arms.

DESCRIPTION OF INVENTION

One common disability is for a person to lose the capacity to grip a tool, as when a spinal cord injury .impairs hand function or when arthritis cripples the joints in the fingers and hands so that there is no significant grip strength, and trigger mechanisms cannot be manipulated. This type of disability prevents the use of many tools, for example a pruning tool used for pruning shrubs in the garden. While such a person cannot grip and use hand tools, it is common for that person to retain at least some limited use of his arms. This allows the hand to be brought into desired position, but it still does not permit the tool to be grasped or actuated so as to carry out the desired task.

In this invention a hand tool is provided which is adapted for use by persons who are unable to grip a tool or actuate a trigger mechanism but who retain the use of an arm. This hand tool comprises a forearm-guided longitudinally extending sleeve and means to secure this sleeve to the user's forearm, the sleeve carrying a hand grip positioned forwardly of the sleeve so the user can position his arm along the sleeve while grasping the grip as best he can. The grip or the sleeve carries a tool structure which extends forwardly of the grip and an electrically operated motor is connected to the tool structure for operating the tool when an electrical connection is made. Means are provided to supply electricity for powering the motor, the electrical connection to the motor including a mercury switch which is mounted to be tilted when the user tilts his forearm. This mercury switch is preferably carried by the sleeve to extend along its length and thus be tilted whenever the user's arm is raised or lowered so that the wrist is positioned either above or below the elbow when it is desired to operate the tool. The mercury switch normally disconnects the electric supply whenever the user's arm is not in the selected position.

As will be appreciated, the supply of electricity is preferably one or more batteries which are carried by the sleeve or by the grip. Pruning tools are particularly contemplated, the pruning device comprising a pair of juxtaposed cutting wheels associated with fingers which turn with the cutting wheels to pull a small branch to be pruned into the space between the cutting wheels, the electric motor turning the wheels to cause the pruning operation to take place. A manually operated kill switch is also preferably provided so that the tool can be turned off regardless of its position so it will not operate when not worn by the user.

It is particularly desired to interconnect the motor with the tool structure by means of a rotatable shaft or cable which provides a flexible coupling. It is also desirable to have the sleeve carry one or more straps for tightening the sleeve upon the user's forearm.

DESCRIPTION OF PREFERRED EMBODIMENT

This invention will be described by reference to a pruning tool which is operated by raising the wrist above the elbow, but it will be understood that other operations, such as picking up objects which are at a lower level, will involve tools which are desirably operated by lowering the wrist below the elbow, and this invention is broadly applicable to such tools.

Referring more particularly to a pruning tool, a longitudinally-extending sleeve is secured to the underside of the forearm, this sleeve being termed a forearm sleeve. Straps, such as those terminated with Velcro elements, are employed to secure the forearm sleeve to the user's forearm.

The sleeve carries a grip positioned forwardly of the sleeve. The user positions his forearm along the length of the sleeve and grasps the grip as best he can. At that point a second person tightens the straps, if the user is unable to do this himself, to prepare the tool for use. It will be understood that the inability of the user to forcefully grasp the grip or to use his fingers to manipulate a trigger prevents the use of the grip for any purpose other than to help support the tool.

The grip is preferably hollow to minimize weight, albeit that hollow grip can be used to house batteries. It is preferred to have the grip carry a shield to protect the users hand and fingers.

The tool structure is carried by the grip or the sleeve, but the sleeve is the preferred support so as to place as much of the weight of the tool as close to the elbow as possible.

An electrical supply means is provided, usually constituted by one or more batteries which provide a transportable power source. These batteries are preferably carried by the sleeve. A small electric motor is powered by the batteries, the motor being preferably positioned below the sleeve and preferably being supported by the sleeve. Lastly, the electrical supply includes an electrical circuit which powers the motor only when a switch is actuated to connect the motor with the supply of electricity.

The tool, such as a pruning device described later, is positioned forwardly of the grip to be in position to be actuated when the user extends his hand toward the object to be worked upon.

In this invention, the switch is a mercury switch which is aligned with the sleeve so that the desired electrical connection is made whenever the user's arm is raised or lowered so that the wrist is positioned either above or below the elbow when it is desired to operate the tool, and to disconnect the electric supply whenever the user's arm is not in the desired position. In a pruning tool, the electrical connection is made by raising the tool so that the wrist is above the elbow.

In this way as the disabled person extends his hand to bring the tool structure into the immediate vicinity of the task he wishes to carry out, the mercury switch is actuated to cause the tool to carry out its intended function. It is also possible for the user to place the tool structure where he desires to use it and then bend his elbow to move his forearm into the position which actuates the motor.

The pruning tool of this invention preferably involve at least one cutting wheel, preferably a pair of cutting wheels each of which are associated with fingers which turn with the wheels to pull a small branch to be pruned into the space between the cutting wheels. When the mercury switch is actuated by the elevation of the hand carrying the tool with respect to the user's elbow, the electric motor turns the wheels to cause the pruning operation to take place.

A manually operated kill switch is preferably present to prevent the tool from being turned on inadvertently and to facilitate evaluation of the user and to assist in his training. This kill switch is simply an on-off switch placed in the electrical circuit between the motor and the electrical supply.

This switch is preferably designed to be operated by someone with good hand functions who would help the user prepare to use his tool.

The invention will now be more particularly described in conjunction with the accompanying drawings in which:

FIG. 1 is a side view in section of a pruning tool constructed in accordance with this invention;

FIG. 2 is a top view of the tool which is partially in cross-section taken on the line 2—2 of FIG. 1 to show the internal gearing mechanism and the cutting wheels and grasping fingers;

FIG. 3 is a front view of the tool resting on a recharging stand and showing the details of the hand shield and the charger in phantom; and FIG. 4 is a side view showing the tool of this invention being held by a user.

Referring more particularly to FIG. 1, the numeral 10 identifies the forearm sleeve which is attached to the user's forearm by fastener straps 11 which include hook and loop Velcro elements, as is itself conventional.

The forearm sleeve 10 extends only partially around the forearm and is hollow to carry (near the user's elbow) rechargeable batteries 12 so that the weight of these batteries is more easily sustained by the user. Two electric contacts 27 are provided to facilitate recharging of the batteries 12.

A mercury switch 14 for actuating the tool is mounted along the length of the sleeve 10. The switch 14 is positioned to extend along the length of the sleeve and is tilted so as to be placed in the "on" position when the forearm is elevated to an angle of about 10 degrees. Mercury switches and their operation are themselves well known.

A kill switch 13 is also preferably present. It is presently contemplated that the kill switch will be of a type and so-positioned that the user cannot himself operate this switch. In this way the kill switch is available for shipping and training purposes.

An electric motor 15 is positioned in the hollow of handgrip 16 where the handgrip joins the forearm sleeve 10. With this placement of the motor, the tool has a low center of gravity. This helps to resist tipping over while the batteries are recharged, as shown in FIG. 3. Motor 15 is connected to the batteries 12 via a simple electrical circuit which includes the switches described above.

The motor 15 is connected to a series of gears 18 forming part of the tool structure by means of a rotatable shaft 17, this connection being shown in FIG. 2. The gears 18 are interconnected to counter-rotate and these gears carry counter-rotating cutting wheels 19. The gears 18 are mounted on axles which may also carry one or more fingers 20 which pull in small branches to be pruned by the cutting wheels 19. Power is transferred from shaft 17 to the gears 18 via drive gears 18A.

A housing 21, which is preferably made of plastic, extends above grip 16 and covers the gears 18 and 18A as well as the cutting wheels 19, except for a funnel-shaped opening 25 into which branches to be pruned are admitted to extend between the cutting wheels 19. Housing 21 reduces the chance the user will inadvertently cut himself.

In the structure shown in FIG. 3, spring-loaded electric contacts 22 of the charger 23 connect with their electric contact counterparts 27 carried by the forearm sleeve to allow recharging of the batteries 12. Charge indicator light 24 is employed so one will know when the recharger is operating.

As shown in FIG. 4, the user's arm is shown resting on the forearm sleeve 10 and secured thereto by straps 11 with the user's hand positioned around grip 16. As can be seen, the user's hand is protected from injury by hand shield 26 as that hand is moved between the branches of a shrub or other object to be pruned.

It is also permissible to mount the mercury switch so that it can be pivoted to allow it to be moved any one of a plurality of different positions. In the pruning tool under discussion this permits the tool to be more easily used for pruning tasks at different elevations. For other tools, this enables that tool to be more easily applied to different tasks. This feature would normally require a companion to pivot the switch into the position best adapted to the task at hand.

What is claimed is:

1. A pruning tool for use by persons who are unable to grip a tool or actuate a trigger mechanism but who retain the use of an arm comprising a forearm-guided longitudinally extending sleeve and means to secure said sleeve to a user's forearm, said sleeve carrying a hand grip positioned forwardly of the sleeve so the user can position his arm along the sleeve while grasping said grip as best he can, said grip or said sleeve carrying a pruning tool structure which extends forwardly of said grip, an electrically operated motor connected to said tool structure for operating the tool when an electrical connection is made, at least one battery for supplying electricity for powering the motor, an electrical connection between said battery and said motor, said connection including a mercury switch which is positioned to be tilted when the user tilts his forearm, said switch electrically connecting said battery to the motor whenever the user's arm is raised so that the user's wrist is positioned above the user's elbow so as to operate said pruning tool when the wrist is so-elevated, and to disconnect the electric supply whenever the user's arm is not in an elevated position.

2. A pruning tool as recited in claim 1 in which a pair of juxtaposed cutting wheels are associated with fingers which turn with said wheels to pull a small branch to be pruned into the space between the cutting wheels, the electric motor turning the wheels to cause the pruning operation to take place.

3. A pruning tool as recited in claim 2 in which said cutting wheels are interconnected with said motor by means of a rotatable shaft which provides a flexible coupling.

4. A pruning tool as recited in claim 1 including a manually operated kill switch enabling the tool to be turned off regardless of its position so it will not operate when not being worn by a user.

5. A pruning tool as recited in claim 1 in which straps are associated with said forearm sleeve for tightening the sleeve upon the user's forearm.

6. A hand tool for use by persons who are unable to grip a tool or actuate a trigger mechanism but who retain the use of an arm comprising a forearm-guided longitudinally extending sleeve and means to secure said sleeve to a user's forearm, said sleeve carrying a hand grip positioned forwardly of the sleeve so the user can position his arm along the sleeve while grasping said grip as best he can, said grip or said sleeve carrying a tool structure which extends forwardly of said grip, an electrically operated motor connected to said tool structure for operating the tool when an electrical connection is made, means for supplying electricity for powering the motor, said electric supply means including a mercury switch which is positioned to be tilted when the user tilts his forearm, said switch connecting the supply of electricity to the motor whenever the user's arm is raised or lowered into a desired position in which the user's wrist is positioned either above or below the user's elbow when it is desired to operate the tool, and to disconnect said electric supply whenever the user's arm is not in the desired position.

7. A hand tool as recited in claim 6 in which one or more batteries are carried by said sleeve or by said grip.

8. A hand tool as recited in claim 7 in which said sleeve is hollow and said batteries are positioned within the hollow of said sleeve, and said grip is hollow with said motor being positioned within said grip.

9. A hand tool as recited in claim 6 in which said mercury switch is pivotable to allow it to be moved into any one of a plurality of different positions.

\* \* \* \* \*